(12) United States Patent
Yamamoto et al.

(10) Patent No.: US 10,745,813 B2
(45) Date of Patent: Aug. 18, 2020

(54) WATER ELECTROLYSIS APPARATUS

(71) Applicant: HONDA MOTOR CO., LTD., Minato-Ku, Tokyo (JP)

(72) Inventors: Kazuhiro Yamamoto, Wako (JP); Naoki Mitsuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/248,171

(22) Filed: Jan. 15, 2019

(65) Prior Publication Data

US 2019/0218671 A1 Jul. 18, 2019

(30) Foreign Application Priority Data

Jan. 17, 2018 (JP) .................. 2018-005257

(51) Int. Cl.
| | |
|---|---|
| *C25B 1/12* | (2006.01) |
| *C25B 13/08* | (2006.01) |
| *C25B 9/10* | (2006.01) |
| *C25B 9/08* | (2006.01) |
| *C25B 9/18* | (2006.01) |
| *C01B 13/02* | (2006.01) |

(52) U.S. Cl.
CPC ............... *C25B 1/12* (2013.01); *C25B 9/10* (2013.01); *C25B 9/18* (2013.01); *C25B 13/08* (2013.01); *C01B 13/0207* (2013.01)

(58) Field of Classification Search
CPC .... C25B 1/12; C25B 9/10; C25B 9/18; C25B 13/08
See application file for complete search history.

(56) References Cited

U.S. PATENT DOCUMENTS

| | | | |
|---|---|---|---|
| 2010/0213051 A1* | 8/2010 | Ishikawa | .................. C25B 1/12 204/252 |
| 2014/0113212 A1* | 4/2014 | Niezelski | .............. H01M 8/241 429/468 |
| 2016/0122885 A1 | 5/2016 | Ishikawa et al. | |

FOREIGN PATENT DOCUMENTS

JP 2016-089220 A 5/2016

* cited by examiner

*Primary Examiner* — Ciel P Contreras
(74) *Attorney, Agent, or Firm* — Carrier Blackman & Associates, P.C.; Joseph P. Carrier; Jeffrey T. Gedeon

(57) ABSTRACT

A differential pressure type high pressure water electrolysis apparatus includes a seal member, which is sandwiched between a cathode side separator and a membrane electrode assembly, and surrounds a cathode electrode catalyst layer, and a pressure resistant member surrounding the seal member from an outer side thereof. A surface pressure applying member is interposed between the seal member and the pressure resistant member. The surface pressure applying member receives a pressing force from the seal member, and applies pressure to the membrane electrode assembly.

4 Claims, 7 Drawing Sheets

WATER ELECTROLYSIS APPARATUS

CROSS-REFERENCE TO RELATED APPLICATION

This application is based upon and claims the benefit of priority from Japanese Patent Application No. 2018-005257 filed on Jan. 17, 2018, the contents of which are incorporated herein by reference.

BACKGROUND OF THE INVENTION

Field of the Invention

The present invention relates to a water electrolysis apparatus which generates oxygen and hydrogen by electrolysis of water.

Description of the Related Art

A water electrolysis apparatus is well known as a device that subjects water to electrolysis to thereby generate hydrogen (and oxygen). The obtained hydrogen is supplied, for example, to a fuel cell in which the hydrogen is used as a fuel gas.

In greater detail, such a water electrolysis apparatus includes an electrolyte electrode assembly, for example, a membrane electrode assembly (MEA), in which an anode electrode catalyst layer is formed on one surface of an electrolyte membrane made of a solid polymer, and a cathode electrode catalyst layer is formed on the other surface thereof. The membrane electrode assembly is sandwiched between power feeding bodies which are disposed respectively on outer sides of the anode electrode catalyst layer and the cathode electrode catalyst layer. When power is supplied to the membrane electrode assembly via the power feeding bodies, the water is subjected to electrolysis in the anode electrode catalyst layer, thereby generating hydrogen ions (protons) and oxygen. The protons thereamong permeate through the electrolyte membrane, migrate to the cathode electrode catalyst layer, and are combined with electrons, whereupon they are converted into hydrogen. On the other hand, the oxygen generated in the anode electrode catalyst layer is discharged together with surplus water from the water electrolysis apparatus.

In this instance, cases are known to occur in which the hydrogen generated in the cathode electrode catalyst layer is obtained at a higher pressure in comparison with the oxygen generated in the anode electrode catalyst layer. This type of water electrolysis apparatus, as described in Japanese Laid-Open Patent Publication No. 2016-089220, is known as a differential pressure type high pressure water electrolysis apparatus. In such a differential pressure type high pressure water electrolysis apparatus, because the internal pressure on the side of the cathode is increased, on the cathode side, there are provided a seal member (for example, an o-ring) for preventing leakage of hydrogen, and a pressure resistant member that surrounds the seal member from the exterior thereof.

SUMMARY OF THE INVENTION

A general object of the present invention is to provide a water electrolysis apparatus, which prevents damage from occurring to an electrolyte membrane assembly due to a differential pressure taking place between a starting time (at a time that hydrogen is generated) and an ending time of electrolysis.

According to an embodiment of the present invention, there is provided a water electrolysis apparatus, comprising:
 an anode side separator;
 a cathode side separator;
 a membrane electrode assembly constituted by providing an anode electrode catalyst layer and a cathode electrode catalyst layer on an electrolyte membrane, and which is positioned between the anode side separator and the cathode side separator;
 a seal member sandwiched between the cathode side separator and the membrane electrode assembly, and surrounding the cathode electrode catalyst layer;
 a pressure resistant member having a hardness higher than that of the seal member, and which surrounds the seal member from an outer side thereof; and
 a surface pressure applying member interposed between the seal member and the pressure resistant member, and which receives a pressing force from the seal member, and applies pressure to the membrane electrode assembly.

In the water electrolysis apparatus in which the cathode electrode catalyst layer is positioned on the inner side (inner circumferential side) of the seal member, when high pressure hydrogen is generated in the cathode electrode catalyst layer, a differential pressure between the inner side and the outer side (outer circumferential side) becomes large. Due to such a differential pressure, the seal member is pressed against the side of the pressure resistant member, along with undergoing deformation so as to fill a gap of the pressure-resistant member. On the other hand, when generation of hydrogen is stopped, and by carrying out a depresurizing process, the interior pressure and the exterior pressure are equalized, and the seal member returns to its original shape, and therefore, the gap is formed between the seal member and a corner portion of the pressure resistant member.

In the gap at the corner, a pressing force which is applied to the electrolyte membrane by the seal member cannot be obtained. Therefore, the electrolyte membrane is dragged by the seal member which undergoes deformation accompanying the change in pressure. At this time, there is a tendency for wrinkles to occur in a relevant portion of the electrolyte membrane.

In order to avoid the occurrence of wrinkles, the surface pressure applying member is interposed between the seal member and the pressure resistant member. The surface pressure applying member converts the pressing force from the seal member into a force (surface pressure) for pressing the membrane electrode assembly. Accordingly, when the seal member moves in the manner described above, positional displacement or shifting in position of the membrane electrode assembly is effectively prevented.

As a result, even if pressure fluctuations occur repeatedly on the cathode side accompanying generation and stopping of generation of the hydrogen, and a force occurs that acts to drag the electrolyte membrane due to deformation of the seal member, the occurrence of wrinkles in the membrane electrode assembly is avoided. The wrinkles also contribute to damage, and therefore by avoiding the occurrence of such wrinkles, the damage can be prevented. Consequently, the durability of the membrane electrode assembly is improved.

The surface pressure applying member preferably includes a first abutting surface that abuts against the membrane electrode assembly, a second abutting surface that abuts against the pressure resistant member, and a third abutting surface that abuts against the seal member, the third abutting surface being inclined in a manner so that an intersecting angle between the third abutting surface and the first abutting surface is an acute angle. In this case, the surface pressure applied to the membrane electrode assembly becomes stronger when the pressure on the side of the cathode becomes high. Accordingly, the occurrence of wrinkles can be more suitably suppressed.

Further, preferably, the cross section of the surface pressure applying member is substantially triangular, having a first side forming the first abutting surface, a second side forming the second abutting surface, and a third side forming the third abutting surface and connected to both the first side and the second side, and wherein a length of the second side is less than that of the first side, and less than one-half the height of the pressure resistant member. By setting the size of the dimensions in the foregoing manner, it is possible to reliably apply the surface pressure to the membrane electrode assembly.

A pressure applying chamber preferably is provided between the cathode electrode catalyst layer and the seal member. High pressure hydrogen, which is generated in the cathode electrode catalyst layer, enters into the pressure applying chamber, whereby the pressing force of the hydrogen is reliably transmitted to the seal member. Since the pressing force is converted into a surface pressure applied with respect to the membrane electrode assembly, it is possible to better prevent positional displacement or shifting in position of the membrane electrode assembly.

According to the present invention, the surface pressure applying member is disposed between the seal member that seals the inner side (inner circumferential side) where high pressure hydrogen is generated, and the pressure resistant member surrounding the outer side (outer circumferential side) of the seal member. The surface pressure applying member converts the pressing force of the hydrogen applied with respect to the seal member into a surface pressure with respect to the membrane electrode assembly.

Accordingly, even in the case that pressure fluctuations occur repeatedly on the side of the cathode accompanying generation and stopping of generation of the hydrogen, and a force occurs that acts to drag the electrolyte membrane due to deformation of the seal member, it is possible to prevent wrinkles from being generated in the membrane electrode assembly, and to prevent damage from occurring to the membrane electrode assembly. For the reasons mentioned above, the durability of the membrane electrode assembly is improved.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a water electrolysis apparatus according to the present invention will be presented and described in detail below with reference to the accompanying drawings.

Figure 1:
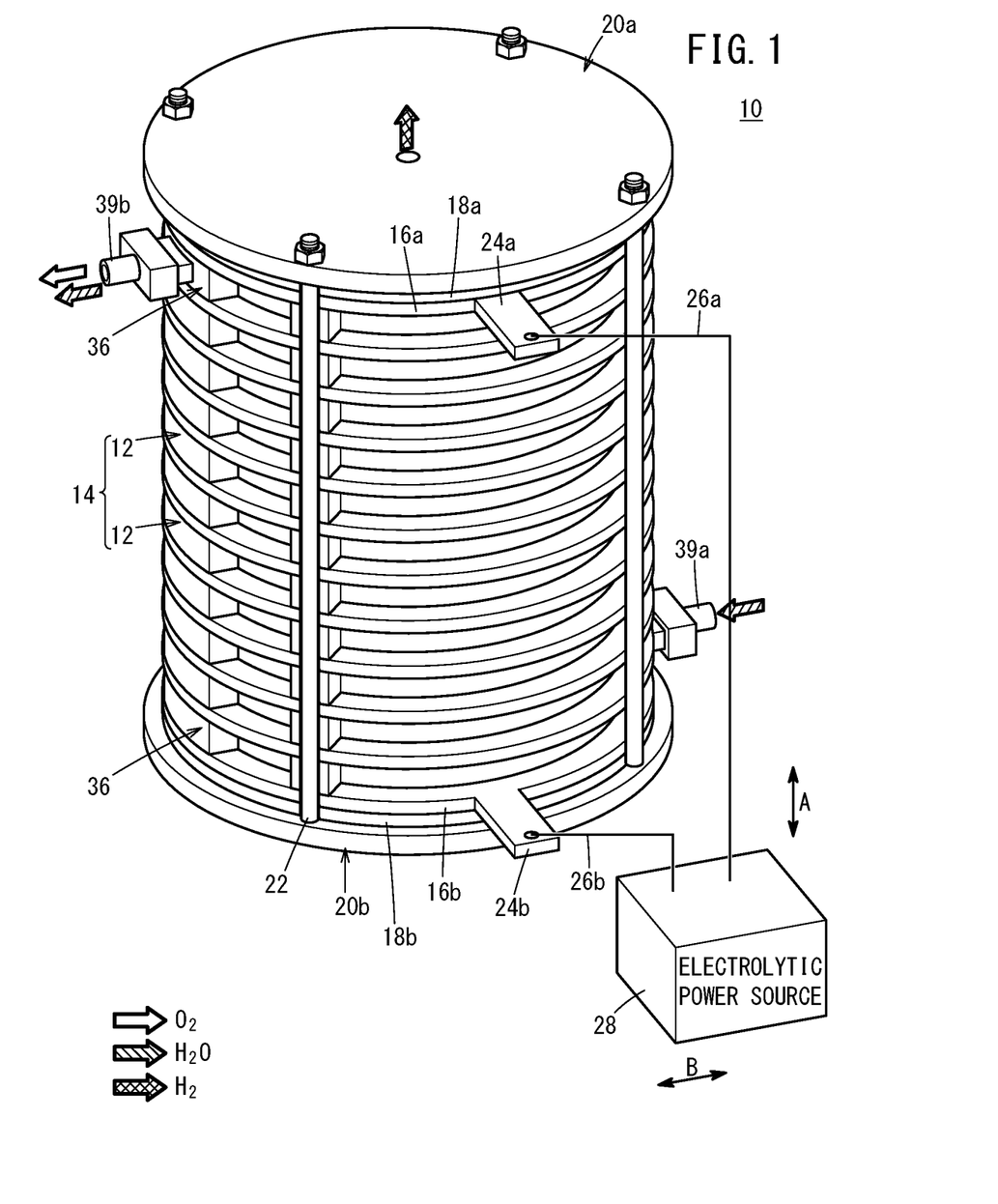
FIG. 1 is a schematic overall perspective view of a differential pressure type high pressure water electrolysis apparatus according to an embodiment of the present invention.

FIG. 1 is a schematic overall perspective view of a differential pressure type high pressure water electrolysis apparatus 10 (water electrolysis apparatus) according to an embodiment of the present invention. The differential pressure type high pressure water electrolysis apparatus 10 comprises a stacked body 14 in which a plurality of high pressure water electrolysis cells 12 are stacked. In FIG. 1, the high pressure water electrolysis cells 12 are stacked in a vertical direction (in the direction of the arrow A), however, the high pressure water electrolysis cells 12 may be stacked in a horizontal direction (in the direction of the arrow B).

A terminal plate 16a, an insulating plate 18a, and an end plate 20a, each having a substantially disc-like shape, are sequentially arranged in an upward direction from below at one end (upper end) in the stacking direction of the stacked body 14. Similarly, a terminal plate 16b, an insulating plate 18b, and an end plate 20b, each having a substantially disc-like shape, are sequentially arranged in a downward direction from above at the other end (lower end) in the stacking direction of the stacked body 14.

In the differential pressure type high pressure water electrolysis apparatus 10, the end plates 20a and 20b are integrally tightened and held by four tie rods 22 extending in the direction of the arrow A, and are fastened in the stacking direction. Moreover, the differential pressure type high pressure water electrolysis apparatus 10 may also be retained together integrally by a box-like casing (not shown) including the end plates 20a and 20b as end plates thereof. Further, although the differential pressure type high pressure water electrolysis apparatus 10 has a substantially cylindrical columnar shape as a whole, the overall shape thereof can be set to any of various shapes, such as a cubic shape.

Terminal portions 24a and 24b are provided in an outwardly projecting manner on side portions of the terminal plates 16a and 16b. The terminal portions 24a and 24b are electrically connected via conductive wirings 26a and 26b to an electrolytic power supply 28.

Figure 2:
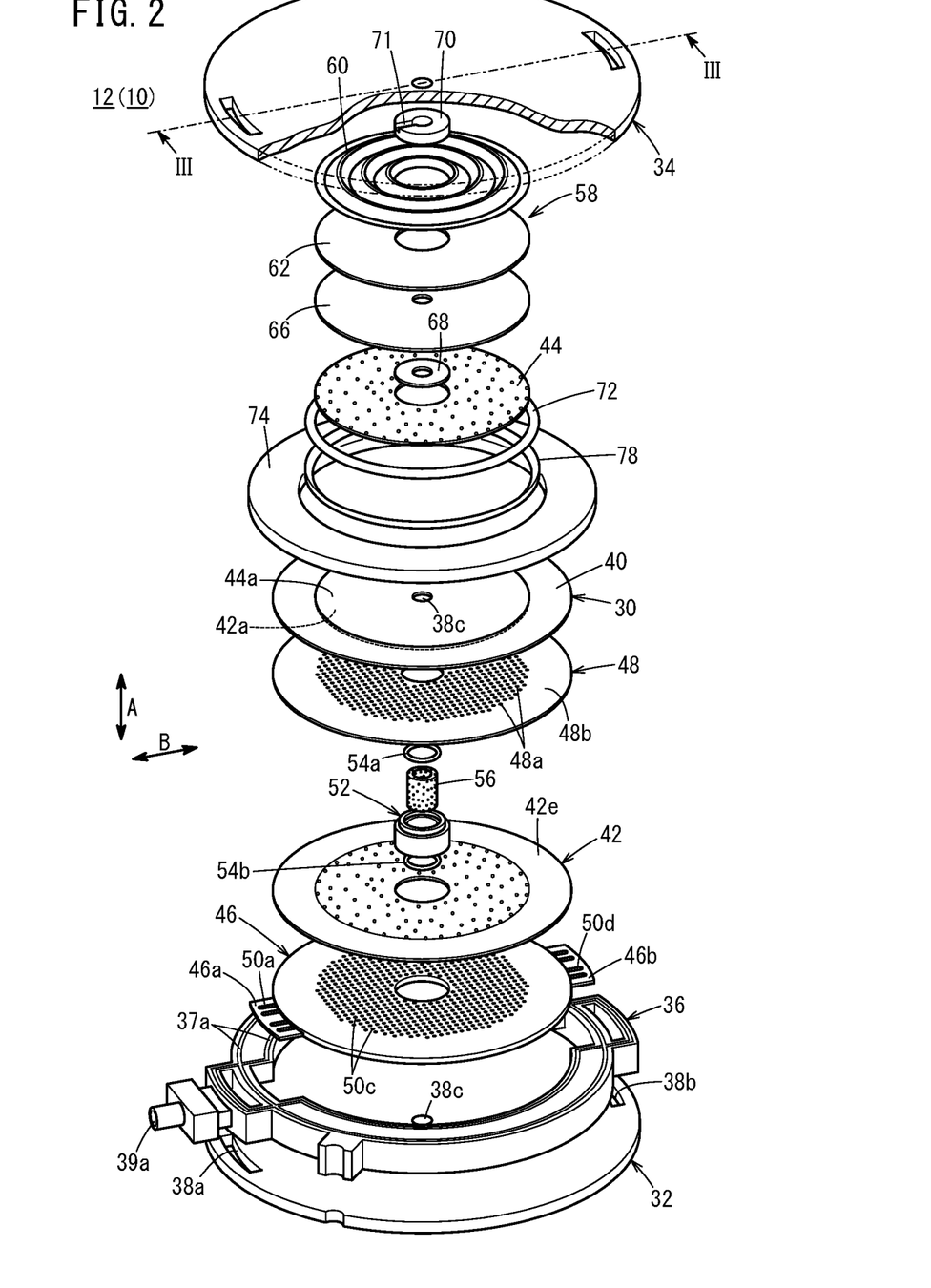
FIG. 2 is an exploded perspective view of a high pressure water electrolysis cell that constitutes part of the differential pressure type high pressure water electrolysis apparatus of FIG. 1.
Figure 3:
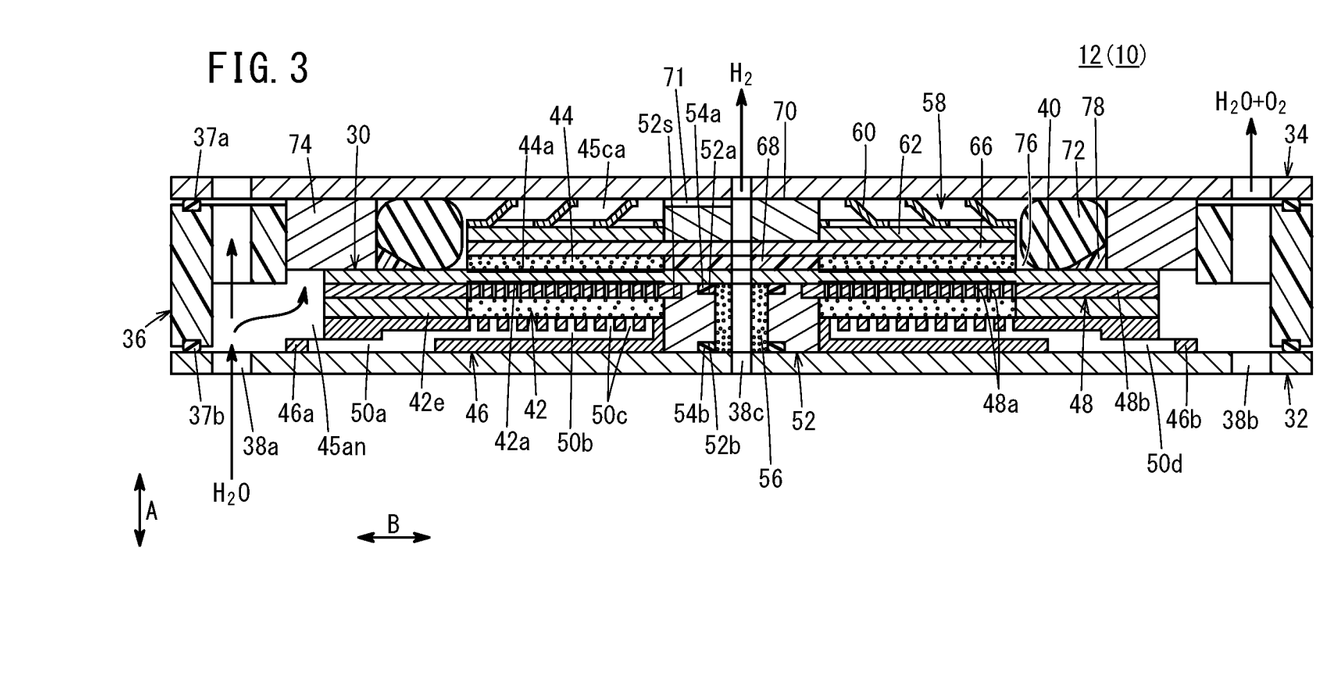
FIG. 3 is a cross-sectional view taken along line III-III in FIG. 2.

As shown in FIGS. 2 and 3, each of the high pressure water electrolysis cells 12 includes a substantially disc-shaped membrane electrode assembly 30, and an anode side separator 32 and a cathode side separator 34 which sandwich the electrolyte membrane electrode assembly 30 therebetween. A resin frame member 36 having a substantially annular shape is disposed between the anode side separator 32 and the cathode side separator 34. The membrane electrode assembly 30 is accommodated in a hollow interior portion of the resin frame member 36.

Seal members 37a and 37b are provided on the upper opening bottom portion and the lower opening bottom portion of the resin frame member 36. The anode side separator 32 and the cathode side separator 34 close the upper opening bottom portion and the lower opening bottom portion of the resin frame member 36, respectively, via the seal members 37a and 37b.

On one end in a diametrical direction of the resin frame member 36, a water supplying communication hole 38a for supplying water (pure water) is provided in mutual communication therewith in the stacking direction (the direction of the arrow A). Further, on the other end in the diametrical direction of the resin frame member 36, a water discharging communication hole 38b is provided for discharging the oxygen generated by the reaction and unreacted water (a mixed fluid).

As shown in FIG. 1, a water supply port 39a communicating with the water supplying communication hole 38a is connected to a side portion of the resin frame member 36, which is arranged in a lowermost location in the stacking direction. Further, a water discharge port 39b communicating with the water discharging communication hole 38b (see FIG. 3) is connected to a side portion of the resin frame member 36, which is arranged in an uppermost location in the stacking direction.

In a central portion of the high pressure water electrolysis cell 12, a high pressure hydrogen communication hole 38c is provided (see FIGS. 2 and 3) which penetrates substantially through the center of an electrolysis region, and communicates mutually therewith in the stacking direction. The high pressure hydrogen communication hole 38c discharges high pressure hydrogen having a pressure (for example, from 1 MPa to 80 MPa) generated by the reaction, and which is higher in pressure than that of the oxygen generated by the same reaction.

The anode side separator 32 and the cathode side separator 34 each have a substantially disc-like shape, and are constituted, for example, of a carbon member or the like. Apart therefrom, the anode side separator 32 and the cathode side separator 34 may be formed by press forming a steel plate, a stainless steel plate, a titanium plate, an aluminum plate, a steel plate subjected to a plating process, or alternatively, a metal plate subjected to an anti-corrosive surface treatment on the metal surface thereof. Alternatively, the anode side separator 32 and the cathode side separator 34 may be formed by applying an anti-corrosive surface treatment after having carried out a cutting process.

The membrane electrode assembly 30 comprises an electrolyte membrane 40 made up from a solid polymer membrane having a substantially ring-like shape. The electrolyte membrane 40 is sandwiched between an anode power feeding body 42 and a cathode power feeding body 44 for electrolysis, which have a ring-like shape. The electrolyte membrane 40 is constituted from a hydrocarbon (HC)-based membrane or a fluorine-based solid polymer membrane, for example.

An anode electrode catalyst layer 42a having a ring-like shape is provided on one surface of the electrolyte membrane 40. A cathode electrode catalyst layer 44a having a ring-like shape is formed on the other surface of the electrolyte membrane 40. As the anode electrode catalyst layer 42a, there is used a ruthenium (Ru)-based catalyst, and as the cathode electrode catalyst layer 44a, there is used a platinum catalyst, for example. The high pressure hydrogen communication hole 38c is formed in a substantially central portion of the electrolyte membrane 40, the anode electrode catalyst layer 42a, and the cathode electrode catalyst layer 44a.

The anode power feeding body 42 and the cathode power feeding body 44 are constituted, for example, from a spherical gas atomizing titanium powder sintered compact (porous conductor), for example. The anode power feeding body 42 and the cathode power feeding body 44 are provided with a smooth surface portion on which an etching process is performed after grinding, and the porosity thereof is set within a range of 10% to 50%, and more preferably, within a range of 20% to 40%. A frame portion 42e is fitted onto an outer circumferential edge portion of the anode power feeding body 42. The frame portion 42e is constituted more densely than the anode power feeding body 42. Moreover, by constituting the outer circumferential portion of the anode power feeding body 42 densely, the outer circumferential portion can also serve as the frame portion 42e.

The hollow interior portion of the resin frame member 36 and the anode side separator 32 form an anode chamber 45an in which the anode power feeding body 42 is accommodated. On the other hand, the hollow interior portion of the resin frame member 36 and the cathode side separator 34 form a cathode chamber 45ca in which the cathode power feeding body 44 is accommodated.

A water flow passage member 46 is interposed at a location (the anode chamber 45an) between the anode side separator 32 and the anode power feeding body 42, and a protective sheet member 48 is interposed at a location between the anode power feeding body 42 and the anode electrode catalyst layer 42a. As shown in FIG. 2, the water flow passage member 46 has a substantially disc-like shape, and an inlet protrusion 46a and an outlet protrusion 46b with a phase difference of roughly 180° are formed on an outer circumferential portion thereof.

A supply connection path 50a, which communicates with the water supplying communication hole 38a, is formed in the inlet protrusion 46a. The supply connection path 50a communicates with a water flow passage 50b (see FIG. 3). Further, a plurality of holes 50c communicate with the water flow passage 50b, and the holes 50c open toward the anode power feeding body 42. On the other hand, a discharge connection path 50d, which communicates with the water flow passage 50b, is formed in the outlet protrusion 46b, and the discharge connection path 50d communicates with the water discharging communication hole 38b.

The inner circumference of the protective sheet member 48 is disposed inside the inner circumference of the anode power feeding body 42 and the cathode power feeding body 44, together with the outer circumferential position thereof being set at the same position as the outer circumferential positions of the electrolyte membrane 40, the anode power feeding body 42, and the water flow passage member 46. Further, the protective sheet member 48 has a plurality of through holes 48a provided within a range (electrolytic region) that faces toward the anode electrode catalyst layer 42a in the stacking direction, and includes a frame portion 48b on the outer side of the electrolytic region. Rectangular holes (not shown) are formed in the frame portion 48b.

Between the anode side separator 32 and the electrolyte membrane 40, a communication hole member 52 is provided, which surrounds the high pressure hydrogen communication hole 38c. The communication hole member 52 is formed in a substantially cylindrical shape, and seal chambers 52a and 52b having a shape that is cut out into a ring-like shape are provided at both axial ends thereof. Seal members (small o-rings) 54a and 54b which surround and seal the high pressure hydrogen communication hole 38c are disposed in the seal chambers 52a and 52b. A groove portion 52s on which the protective sheet member 48 is disposed is formed on an end surface of the communication hole member 52 that faces toward the electrolyte membrane 40.

A cylindrical porous member 56 is disposed between the high pressure hydrogen communication hole 38c and the seal chambers 52a and 52b. The high pressure hydrogen communication hole 38c is formed in a central portion of the porous member 56. The porous member 56 is interposed between the anode side separator 32 and the electrolyte membrane 40. The porous member 56 is formed by a ceramic porous body, a resin porous body, or a porous body made of a mixed material of ceramic and resin, however, apart therefrom, various other materials may be used.

As shown in FIGS. 2 and 3, a load applying mechanism 58 which presses the cathode power feeding body 44 toward the side of the electrolyte membrane 40 is disposed in the cathode chamber 45ca. The load applying mechanism 58 is constituted by an elastic member, for example, a plate spring 60, and the plate spring 60 applies a load to the cathode power feeding body 44 via a metal plate spring holder (shim member) 62. As the elastic member, in addition to the plate spring 60, a disc spring, a coil spring, or the like may be used.

A conductive sheet 66 is disposed between the cathode power feeding body 44 and the plate spring holder 62. The conductive sheet 66 is constituted, for example, from a metal sheet of titanium, SUS, iron, or the like, has a ring-like shape, and is set to have substantially the same diameter as that of the cathode power feeding body 44.

In a central portion of the cathode power feeding body 44, an insulating member, for example, a resin sheet 68, is disposed between the conductive sheet 66 and the electrolyte membrane 40. The resin sheet 68 is fitted into an inner circumferential surface of the cathode power feeding body 44. The thickness of the resin sheet 68 is set to be substantially the same as that of the cathode power feeding body 44. As the resin sheet 68, for example, PEN (polyethylene naphthalate), a polyimide film, or the like may be used.

A communication hole member 70 is disposed between the resin sheet 68 and the cathode side separator 34. The communication hole member 70 has a cylindrical shape, and the high pressure hydrogen communication hole 38c is formed in a central portion thereof. At one end in the axial direction of the communication hole member 70, a hydrogen discharge passage 71 is formed that communicates with the cathode chamber 45ca and the high pressure hydrogen communication hole 38c.

In the cathode chamber 45ca, a large o-ring 72 (seal member) is arranged around the outer circumference of the cathode power feeding body 44, the plate spring holder 62, and the conductive sheet 66. A pressure resistant member 74 having a hardness which is higher than that of the large o-ring 72 is disposed on the outer circumference of the large o-ring 72. The pressure resistant member 74 has a substantially ring-like shape, together with the outer circumferential portion thereof being fitted into the inner circumferential portion of the resin frame member 36.

Figure 4:
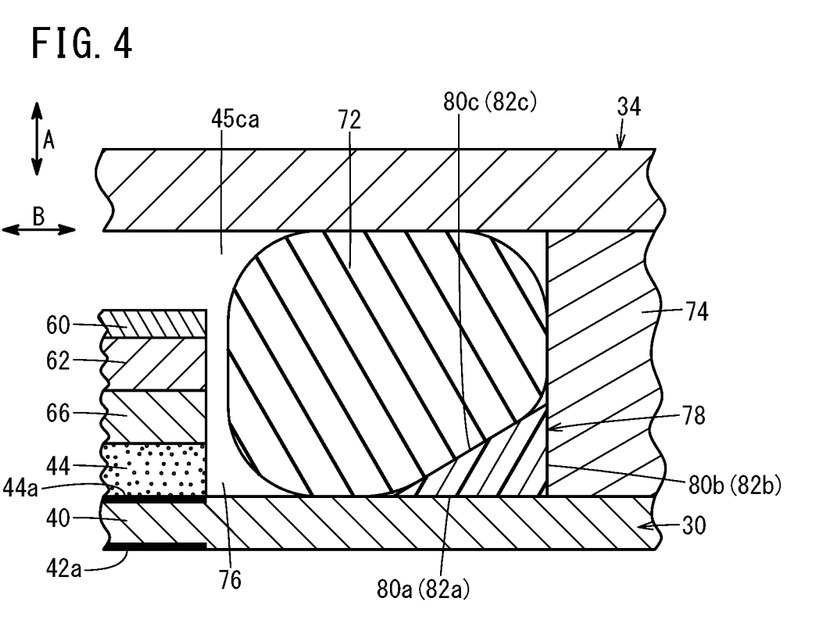
FIG. 4 is an enlarged cross-sectional view of principal parts of the high pressure water electrolysis cell.

As shown in FIGS. 3 and 4, the inner circumferential wall of the large o-ring 72 is separated from the cathode power feeding body 44, the conductive sheet 66, the plate spring holder 62, and the plate spring 60. A clearance, which is generated by such a separation, becomes a pressure applying chamber 76 that forms a portion of the cathode chamber 45ca. When the hydrogen generated in the cathode electrode catalyst layer 44a enters into the cathode chamber 45ca, the hydrogen also enters into the pressure applying chamber 76, which makes up a portion of the cathode chamber 45ca.

A backup ring 78 which serves as a surface pressure applying member is interposed between the large o-ring 72 and the pressure resistant member 74. As can be appreciated from FIG. 4, which is an enlarged cross-sectional view of principal parts, the backup ring 78 has a substantially triangular cross section along the radial direction, and fills a substantially triangular shaped gap that is formed between the large o-ring 72 and the lower half of the pressure resistant member 74. The backup ring 78 having such a shape includes a first abutting surface 80a that abuts against the membrane electrode assembly 30, a second abutting surface 80b that abuts against the pressure resistant member 74, and a third abutting surface 80c that abuts against the large o-ring 72. Hereinafter, a side forming the first abutting surface 80a, a side forming the second abutting surface 80b, and a side forming the third abutting surface 80c will be referred to respectively as a first side 82a, a second side 82b, and a third side 82c. Among the sides, the first side 82a is a bottom side, and the third side 82c is an oblique side connected to both the first side 82a and the second side 82b, whereby the radial cross section of the backup ring 78 is formed in a substantially triangular shape.

Preferably, the length of the second side 82b, which is a side in the height direction, is smaller than the length of the first side 82a which is the bottom side. Further, the length of the second side 82b is preferably less than one-half the height (thickness) of the pressure resistant member 74. The reasons for these features will be described later.

The backup ring 78 is preferably made from a material having a low coefficient of friction. As a suitable example for such a material, there may be cited polytetrafluoroethylene resin.

The differential pressure type high pressure water electrolysis apparatus 10 according to the present embodiment is basically constructed in the manner described above. Next, advantageous effects thereof will be described in relation to operations of the differential pressure type high pressure water electrolysis apparatus 10.

When electrolysis of water is initiated, as shown in FIG. 1, the water is supplied from the water supply port 39a to the water supplying communication hole 38a, and a voltage is applied from the electrolytic power supply 28 to the terminal portions 24a and 24b of the terminal plates 16a and 16b via the conductive wirings 26a and 26b. Therefore, as shown in FIG. 3, in each of the high pressure water electrolysis cells 12, water is supplied from the water supplying communication hole 38a to the water flow passage 50b of the water flow passage member 46 through the supply connection path 50a. The water is supplied to the anode power feeding body 42 from the plurality of holes 50c, and moves into the interior of the anode power feeding body 42 which is a porous body.

The water further passes through the through holes 48a, and arrives at the anode electrode catalyst layer 42a. The water is subjected to electrolysis in the anode electrode catalyst layer 42a, and an anodic reaction is made to occur in which protons, electrons, and oxygen are generated. The protons thereamong permeate through the electrolyte membrane 40, migrate to the side of the cathode electrode catalyst layer 44a, and a cathodic reaction occurs in which the protons are combined with electrons. As a result, hydrogen as a gas phase is obtained.

The hydrogen flows to the cathode chamber 45ca along the hydrogen flow passage inside the cathode power feeding body 44, and furthermore, the hydrogen is discharged from the hydrogen discharge passage 71 into the high pressure hydrogen communication hole 38*c*. The hydrogen flows through the high pressure hydrogen communication hole 38*c*, in a state of being maintained at a higher pressure than the water supplying communication hole 38*a*, and can be taken out to the exterior of the differential pressure type high pressure water electrolysis apparatus 10. On the other hand, the oxygen generated by the reaction and unreacted water are discharged to the exterior of the differential pressure type high pressure water electrolysis apparatus 10 from the water discharging communication hole 38*b* via the water discharge port 39*b*.

Figure 5:
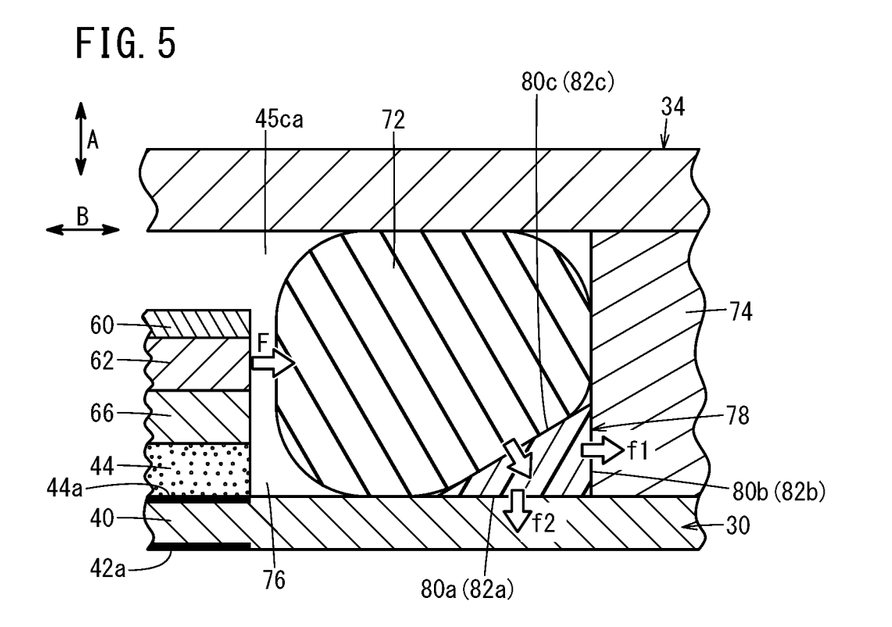
FIG. 5 is an enlarged cross-sectional view of principal parts, showing a state in which a pressing force of high pressure hydrogen acts on a large o-ring (seal member)

A portion of the hydrogen generated in the cathode electrode catalyst layer 44*a* enters into the cathode chamber 45*ca* including the pressure applying chamber 76 thereof. Since the hydrogen that enters into the cathode chamber 45*ca* and eventually into the pressure applying chamber 76 has a high pressure as described above, in each of the high pressure water electrolysis cells 12, the interior of the large o-ring 72 becomes higher in pressure, and the exterior thereof becomes lower in pressure. Therefore, as shown in FIG. 5, a pressing force F is applied to the large o-ring 72 to thereby move and compress the large o-ring 72 in a manner so as to be pressed against the side of the pressure resistant member 74. The backup ring 78 receives the pressing force F.

More specifically, on the backup ring 78, the third abutting surface 80*c* which abuts against the large o-ring 72 is pressed by the large o-ring 72. Since the third side 82*c* forming the third abutting surface 80*c* is an oblique side, the pressing force F of the large o-ring 72 acts along a direction substantially orthogonal to the third side 82*c*. The pressing force F is further distributed in a direction substantially perpendicular to each of the first side 82*a* and the second side 82*b*. Therefore, the first side 82*a* (the first abutting surface 80*a*) presses the electrolyte membrane 40 with a distributed force f2, and the second side 82*b* (the second abutting surface 80*b*) presses the pressure resistant member 74 with a distributed force f1. In this manner, the pressing force F generated by diametrical enlargement of the large o-ring 72 is converted by the backup ring 78 into the force f2 that presses the electrolyte membrane 40 against the protective sheet member 48.

In the foregoing manner, by providing the pressure applying chamber 76 on the inner side of the backup ring 78, the hydrogen pressure is reliably transmitted to the large o-ring 72. As a result, the pressing force F of the large o-ring 72 is transmitted to the electrolyte membrane 40 via the first abutting surface 80*a* of the backup ring 78, and thus, the surface pressure (distributed force f2) is applied to the membrane electrode assembly 30 from the backup ring 78. Accordingly, the membrane electrode assembly 30 is pressed strongly against the protective sheet member 48. In the foregoing manner, the large o-ring 72 and the first abutting surface 80*a* of the backup ring 78 abut against the electrolyte membrane 40, whereby the surface pressure applied to the electrolyte membrane 40 becomes substantially constant from the inner side to the outer side of the large o-ring 72.

In this instance, when the length of the first side 82*a* is longer in comparison with the length of the second side 82*b*, the first abutting surface 80*a* presses the electrolyte membrane 40 toward the side of the protective sheet member 48 over a wide range. Stated otherwise, the pressing force F from the backup ring 78 can be transmitted across a wide range of the electrolyte membrane 40. Further, when the length of the second side 82*b* is made less than one-half the height (thickness) of the pressure resistant member 74, an assembly can be carried out in which the outer diameter of the large o-ring 72 at a time of assembly is brought into contact with both the electrolyte membrane 40 and the inner circumferential wall of the pressure resistant member 74, and therefore, it is possible to securely press and hold down the backup ring 78.

In the case that the backup ring 78 did not exist, the electrolyte membrane 40 would be pulled accompanying movement of the large o-ring 72 toward the side of the pressure resistant member 74 and deformation thereof, so as to be pressed against the pressure resistant member 74, leading to a concern that wrinkles could be generated in the electrolyte membrane 40. In contrast thereto, according to the present embodiment, as described above, the pressing force F of the backup ring 78 is converted into a surface pressure (distributed force f2) that presses the electrolyte membrane 40 (membrane electrode assembly 30) against the protective sheet member 48. Stated otherwise, the electrolyte membrane 40 is pressed toward the protective sheet member 48.

Due to the pressing force, it is unlikely that the membrane electrode assembly 30 would be displaced with respect to the protective sheet member 48. Accordingly, even if the large o-ring 72 moves or undergoes deformation, the electrolyte membrane 40 is prevented from being pulled along with it. Therefore, the concern that wrinkles may be generated in the electrolyte membrane 40 can be dispensed with.

When the operation of the differential pressure type high pressure water electrolysis apparatus 10 is stopped and thus the electrolysis is stopped, in order to eliminate a pressure difference between the anode chamber 45*an* on a side at a low pressure (normal pressure) and the cathode chamber 45*ca* on a side where the pressure is high, a pressure reduction (depressurization) process is performed in the cathode chamber 45*ca*. As a result, the internal pressure and the external pressure of the large o-ring 72 become equalized. Therefore, since the large o-ring 72 is released from the pressing force F, the large o-ring 72 expands and returns to its original shape, together with moving to its original position.

At this time as well, the state in which the first abutting surface 80*a* of the backup ring 78 is in abutment against the electrolyte membrane 40 is continued. Accordingly, in the same manner as described above, it is unlikely for the membrane electrode assembly 30 to undergo positional displacement or shifting with respect to the protective sheet member 48, and accompanying movement of the large o-ring 72 or restoration thereof to its original shape, the electrolyte membrane 40 is prevented from being pulled. Stated otherwise, the concern that wrinkles may be generated in the electrolyte membrane 40 can be dispensed with.

Even under a condition in which starting and stopping of electrolysis are repeated, for the same reasons as described above, the electrolyte membrane 40 is prevented from being pulled accompanying movement of the large o-ring 72. Accordingly, wrinkles are prevented from occurring. Since the generation of wrinkles contributes to damage, according to the present embodiment, it is possible to effectively prevent damage from being caused to the membrane electrode assembly 30 due to the differential pressure between a starting time (at a time that hydrogen is generated) and an ending time of electrolysis.

The present invention is not particularly limited to the embodiment described above, and various modifications can be adopted therein within a range that does not depart from the essence and gist of the present invention.

For example, the backup ring is not particularly limited to the backup ring 78 having a substantially triangular cross section, and may be of any shape that is capable of converting the pressing force from the large o-ring 72 into a force (surface pressure) that presses on the electrolyte membrane 40.

Figure 6:
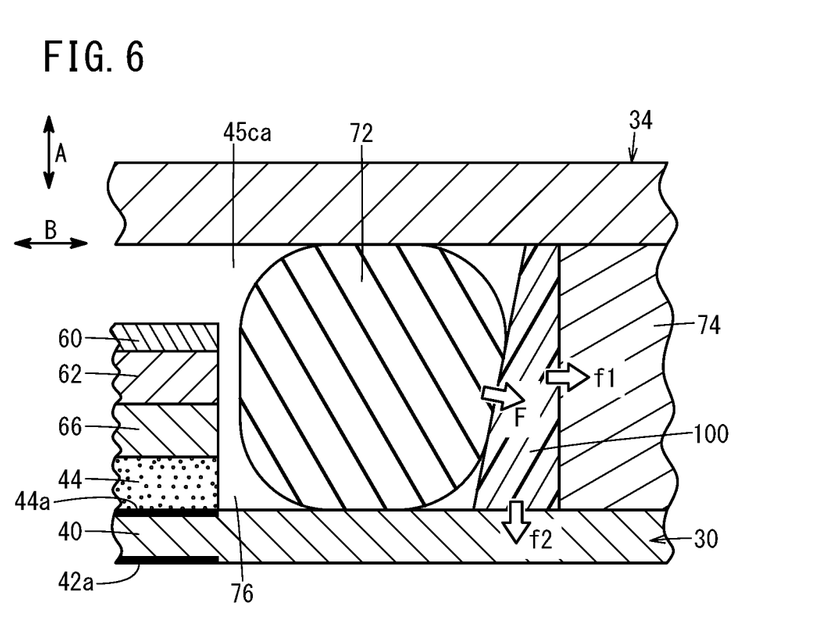
FIG. 6 is a vertical cross-sectional view of principal parts of a high pressure water electrolysis cell, which is configured in a manner utilizing a backup ring (surface pressure applying member) of another shape.

More specifically, as shown in FIG. 6, the backup ring 100 may have a trapezoidal cross section. In this case as well, the lower side of the trapezoidal shape presses the electrolyte membrane 40 toward the protective sheet member 48.

Figure 7:
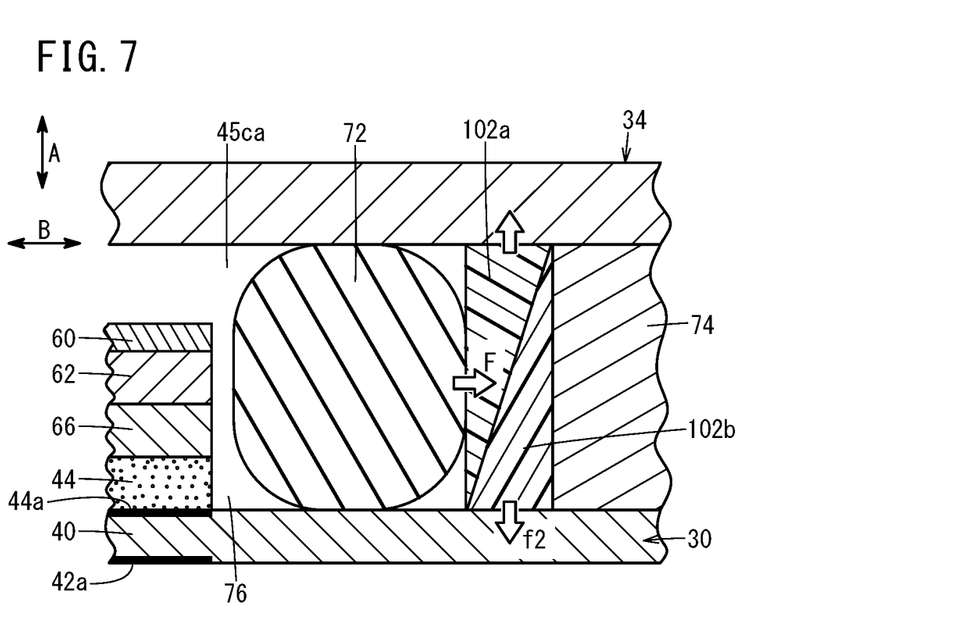
FIG. 7 is a vertical cross-sectional view of principal parts of a high pressure water electrolysis cell, which is configured in a manner utilizing two backup rings of yet another shape.

Alternatively, as shown in FIG. 7, a first backup ring 102a and a second backup ring 102b, each of which is substantially in the form of a right triangle in cross section, may be placed adjacent to each other. In this case, the first backup ring 102a is set on an inner circumferential side, and the second backup ring 102b is set on an outer circumferential side, and the inclined surfaces of the first backup ring 102a and the second backup ring 102b are placed in abutment against each other.

In this case, when the large o-ring 72 presses on the first backup ring 102a, the pressing force F is distributed to the cathode side separator 34 and to the oblique side of the first backup ring 102a. The pressing force distributed to the oblique side is transmitted to the second backup ring 102b via the oblique side of the second backup ring 102b. Furthermore, a portion of the pressing force transmitted to the second backup ring 102b is converted into a force f2 by which a lower surface of the second backup ring 102b, which is in abutment against the electrolyte membrane 40, presses the electrolyte membrane 40 toward the protective sheet member 48.

In the foregoing manner, in the case of using the backup ring 100 or the first backup ring 102a and the second backup ring 102b, the membrane electrode assembly 30 can be pressed against the protective sheet member 48 in the same manner as described above. Therefore, it is possible to prevent the membrane electrode assembly 30 from undergoing positional displacement or shifting in position, and therefore, it is possible to prevent generation of wrinkles or damage from occurring in the membrane electrode assembly 30.

What is claimed is:

1. A water electrolysis apparatus, comprising:
   an anode side separator;
   a cathode side separator;
   a membrane electrode assembly constituted by providing an anode electrode catalyst layer and a cathode electrode catalyst layer on an electrolyte membrane, and which is positioned between the anode side separator and the cathode side separator;
   a seal member sandwiched between the cathode side separator and the membrane electrode assembly, and surrounding the cathode electrode catalyst layer, the cathode electrode catalyst layer and the seal member being disposed in a single chamber;
   a pressure resistant member having a hardness higher than that of the seal member, and which surrounds the seal member from an outer side thereof and defines the chamber; and
   a surface pressure applying member disposed in the chamber, and interposed between the seal member and the pressure resistant member and between the seal member and the membrane electrode assembly at a position in which the surface pressure applying member transmits a pressing force from the seal member to the membrane electrode assembly, the surface pressure applying member receiving the pressing force from the seal member, and applying pressure to the membrane electrode assembly.

2. The water electrolysis apparatus according to claim 1, wherein the surface pressure applying member includes a first abutting surface that abuts against the membrane electrode assembly, a second abutting surface that abuts against the pressure resistant member, and a third abutting surface that abuts against the seal member, the third abutting surface being inclined in a manner so that an intersecting angle between the third abutting surface and the first abutting surface is an acute angle.

3. The water electrolysis apparatus according to claim 2, wherein a cross section of the surface pressure applying member is triangular, having a first side forming the first abutting surface, a second side forming the second abutting surface, and a third side forming the third abutting surface and connected to both the first side and the second side, and wherein a length of the second side is less than that of the first side, and less than one-half of a height of the pressure resistant member.

4. The water electrolysis apparatus according to claim 1, further comprising a pressure applying chamber formed between the cathode electrode catalyst layer and the seal member, and into which hydrogen generated in the cathode electrode catalyst layer enters.

* * * * *